US012732366B2

(12) United States Patent
Polerecky et al.

(10) Patent No.: US 12,732,366 B2
(45) Date of Patent: Sep. 8, 2026

(54) DISTRIBUTED IDENTITY MANAGEMENT FOR A DECENTRALIZED PLATFORM

(71) Applicant: Quotient Partners, LLC, Greenwich, CT (US)

(72) Inventors: Eric Polerecky, Howell, MI (US); Charles C. Fry, Austin, TX (US); Jehiel Martinez, San Pedro Sula (HN); Gunveer Natt, Cupertino, CA (US); Francis Casale, Greenwich, CT (US)

(73) Assignee: Quotient Partners, LLC, Greenwich, CT (US)

( * ) Notice: Subject to any disclaimer, the term of this patent is extended or adjusted under 35 U.S.C. 154(b) by 26 days.

(21) Appl. No.: 18/705,871

(22) PCT Filed: Jan. 30, 2023

(86) PCT No.: PCT/US2023/011841
§ 371 (c)(1),
(2) Date: Apr. 29, 2024

(87) PCT Pub. No.: WO2023/177480
PCT Pub. Date: Sep. 21, 2023

(65) Prior Publication Data

US 2025/0015994 A1 Jan. 9, 2025

Related U.S. Application Data

(60) Provisional application No. 63/319,992, filed on Mar. 15, 2022.

(51) Int. Cl.
*H04L 9/32* (2006.01)
*G06F 21/62* (2013.01)
(Continued)

(52) U.S. Cl.
CPC ................ *H04L 9/32* (2013.01); *G06F 21/62* (2013.01); *H04L 9/0643* (2013.01); *H04L 9/30* (2013.01)

(58) Field of Classification Search
None
See application file for complete search history.

(56) References Cited

U.S. PATENT DOCUMENTS

2013/0124309 A1* 5/2013 Traasdahl ............ H04L 67/535 705/14.49
2015/0379510 A1 12/2015 Smith et al.
(Continued)

OTHER PUBLICATIONS

International Search Report and Written Opinion received in International Application No. PCTUS2023011841, mailed May 4, 2023 (6 pages).

*Primary Examiner* — Raqiul A Choudhury
(74) *Attorney, Agent, or Firm* — Volpe Koenig

(57) ABSTRACT

A method is implemented by an engine to manage distributed identities for users of a decentralized platform. The engine is executed by a processor within the decentralized platform. The method includes generating a cryptographically secure and reusable distributed identity for an owner that obfuscates an identity of the owner and associating the cryptographically secure and reusable distributed identity with a blockchain of the decentralized platform. The method includes gating, via an owner authorization flow by the engine, access to digital information and services for the users of the decentralized platform. The digital information and services being associated with the cryptographically secure and reusable distributed identity.

20 Claims, 3 Drawing Sheets

(51) Int. Cl.
*H04L 9/06* (2006.01)
*H04L 9/30* (2006.01)

(56) References Cited

U.S. PATENT DOCUMENTS

| | | | | |
|---|---|---|---|---|
| 2016/0085955 | A1 | 3/2016 | Lerner | |
| 2016/0098548 | A1* | 4/2016 | Vancini | G06F 21/335<br>726/4 |
| 2016/0189181 | A1* | 6/2016 | McClave | G06Q 50/01<br>705/7.33 |
| 2017/0046799 | A1 | 2/2017 | Chan et al. | |
| 2017/0046806 | A1 | 2/2017 | Haldenby et al. | |
| 2017/0185981 | A1 | 6/2017 | Emmerson | |
| 2017/0257358 | A1 | 9/2017 | Ebrahimi et al. | |
| 2018/0359089 | A1* | 12/2018 | Innes | H04L 9/30 |
| 2020/0117825 | A1* | 4/2020 | Vaswani | H04L 9/50 |
| 2020/0314486 | A1* | 10/2020 | Thoresz | G06F 21/10 |
| 2020/0344055 | A1* | 10/2020 | Topps | H04L 9/0822 |

* cited by examiner

DISTRIBUTED IDENTITY MANAGEMENT FOR A DECENTRALIZED PLATFORM

This application is a national stage entry of International Application No. PCT/US2023/011841, filed Jan. 30, 2023, which claims priority to provisional U.S. Application No. 63/319,992, filed Mar. 15, 2022, the contents of which are hereby incorporated by reference in their entirety.

FIELD OF INVENTION

The present invention is related to a distributed identity (DID) management for a decentralized platform.

BACKGROUND

Conventionally, digital information and computing are limited to a conventional central server architecture (e.g., whether using a client-server model or using personal devices) managed and controlled by a third-party central authority. More particular, the third-party central authority (e.g., centralized, privately controlled service providers) is able to access, read, and censor the digital information created and provided by users, as well as manipulation and control of user identities and corresponding user behavior (requiring authentication and verification of the users).

For example, the third-party central authority require verifiable user identities to provide selective access to corresponding digital information or to validate ownership of that digital information. Generally, the third-party central authority utilizes a central server, database, and/or other directory service to implement authentication and verification of the user identities. More particularly, the third-party central authority utilizes a single source of control within the central server, database, and/or other directory service via a central list, table, or database that contains all user identification (UID) information for the users.

This single source of control is a major security vulnerability for the third-party central authority, and in turn the users. This single source of control, also, limits the third-party central authority's ability to provide anonymity to the users. Yet, despite these concerns, the third-party central authority can still manipulate, censor, aggregate, control, and monetize the digital information of the users.

Users want control of their digital information. Users also want security for and anonymity for their UID information. There are presently no architectures that can provide a decentralized mechanism for sharing digital information, thereby enabling such user control.

SUMMARY

A method is implemented by an engine to manage distributed identities for users of a decentralized platform. The engine is executed by a processor within the decentralized platform. The method includes generating a cryptographically secure and reusable distributed identity for an owner that obfuscates an identity of the owner and associating the cryptographically secure and reusable distributed identity with a blockchain of the decentralized platform. The method includes gating, via an owner authorization flow by the engine, access to digital information and services for the users of the decentralized platform. The digital information and services being associated with the cryptographically secure and reusable distributed identity. The method herein can be implemented as a system, apparatus, device, and/or computer program product.

BRIEF DESCRIPTION OF THE DRAWINGS

A more detailed understanding may be had from the following description, given by way of example in conjunction with the accompanying drawings, wherein like reference numerals in the figures indicate like elements, and wherein:

FIG. 1 illustrates a method according to one or more embodiments;

DETAILED DESCRIPTION

Figure 2:
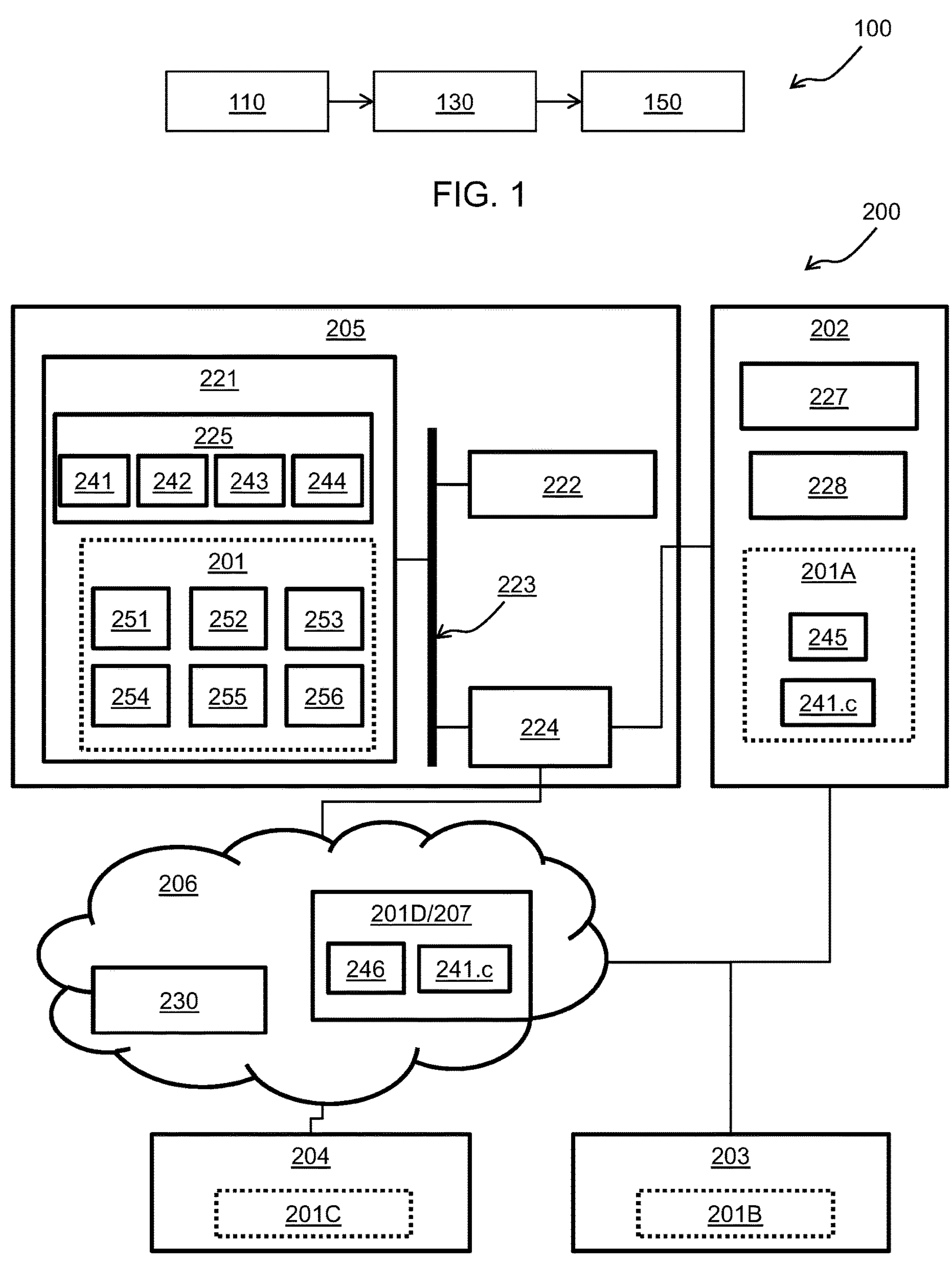
FIG. 2 illustrates an architecture according to one or more embodiments.

Disclosed herein is a distributed identity (DID) management for a decentralized platform. The decentralized platform can support at least private and autonomous social media activity through the DID management, as well as secure, private, personal data and computing provisions.

According to one or more embodiments, the DID management and the secure, private, personal data and computing provisions are a processor executable code or software that is necessarily rooted in process operations by, and in processing hardware of, the decentralized platform. For ease of explanation, an engine is described herein with respect to the DID management and these secure, private, personal data and computing provisions.

FIG. 1 illustrates a method 100 according to one or more embodiments. The method 100, generally, illustrates DID management operations by the engine.

The method 100 begins at block 110, where the engine generates a cryptographically secure and reusable DID for an owner that obfuscates an identity of the owner. For example, the engine enables a user to create and own a cryptographically secure and reusable DID (referred herein for brevity as DID). Each DID independently, anonymously (i.e., obfuscates an identity), and securing manages all UID information and services for a particular user. Each DID can be a cryptographic hash of a username, so that the engine and the decentralized platform does not know any identify information.

At block 130, the engine associates the DIDs with a blockchain of the decentralized platform. The blockchain guarantee fidelity and security for the DIDs, the decentralized platform, the engine, and data retention which provides trust between nodes of the decentralized platform without a need for a third-party central authority. One or more advantages, technical effects, and/or benefits of the DIDs of the engine can include eliminating a need for a central server, database, and/or other directory service of a third-party central authority.

At block 150, the engine gates access, such as access to the nodes of the decentralized platform. According to one or more embodiments, the engine gates access to digital information and services for users of the decentralized platform. The digital information and services are associated with the cryptographically secure and reusable distributed identity. According to one or more embodiments, to gate access, the engine implements an owner authorization flow (a.k.a., a reverse authorization flow), which is in contrast and a technical improvement to conventional Web2 and Web3 approval processes where an identity provider holds a private key that is then trusted by a third-party central authority. The owner authorization flow is a user controlled process that supports inviting others users to participate in the private social media activity.

One or more advantages, technical effects, and/or benefits of the DIDs can include enabling user anonymity and control within the decentralized platform free from any third-party central authority manipulation. Thus, the engine particularly utilizes and transforms the decentralized platform to enable/implement private social media activity that otherwise is not currently available with the conventional central server architecture.

FIG. 2 illustrates a diagram of an architecture 200 (also referred to as a decentralized platform) according to one or more embodiments. Generally, the architecture 200 provides a node based decentralized platform that implements local data retention. While single elements are shown in FIG. 2, these single elements are representative of a plurality of that element. The architecture 200 includes an engine 201, a device 202, computing platforms 203 and 204, a server 205, a network 206, and a service 207, each of which can represent a node within the architecture 200.

The engine 201 can be hardware, software, or a combination thereof. As shown, the engine 201 can be software that operates within the server 205. Generally, the engine 201 can be stored on a memory (e.g., a system memory 221) as software components, modules, instructions, or the like for execution by a processor (e.g., a processor 222). According to one or more embodiments, the engine 201 can be software (e.g., an application) implemented through one or more different instances 201A, 201B, 201C, and 201D. Therefore, the engine 201 is detailed as a dashed-box 201A to illustrate a scalability and a portability of the engine 201 within the architecture 200 (e.g., the engine 201 can be implemented through one or more different instances 201, 201A, 201B, 201C, and 201D, which can further communicate therebetween). As an example, the engine 201 can be implemented as the service 207, which provides at least public aspects of a blockchain of the architecture 200. The blockchain of the architecture 200 can guarantee fidelity and security for the architecture 200, for the local data retention, and for user/device/server/node identities, as well as generate trust between nodes without a need for a third-party central authority.

According to one or more embodiments, the engine 201 implements a practical use of the blockchain of the architecture 200 to enable social networking (i.e., sharing pictures, stories, messaging, etc.). More particularly, the engine 201A executing in the device 202, the engine 201 executing the server 205, and the service 207 uniquely employ public and private key pairs to cryptographically secure identities for users/devices/servers/nodes and to regulate authorization of logins of the users/devices/servers/nodes. For example, each instance 201, 201A, 201B, 201C, and 201D of the engine 201 enables peer to peer connections within the architecture 200, such as by using the blockchain of the architecture 200, to create and provide social media experience without the conventional central server architecture. More particularly, to form the architecture 200 (e.g., the decentralized platform), a first instance 201 can be on the server 205 (e.g., a server instance of the private server), a second instance 201A can be on the device 202 (e.g., a mobile instance or terminal application on a mobile phone), a third instance 201D can be on the network 206 (e.g., the service 207), and the first, second, and third instances 201, 201A, and 201D can act together to create and provide the social media experience (e.g., a three-part contribution process). Operations of the engine 201 are further described herein.

The device 202, the computing platforms 203 and 204, and the server 205 can be any combination of software and/or hardware that individually or collectively store, execute, and implement the engine 201 and functions thereof. Further, the device 202, the computing platforms 203 and 204, and the server 205 can each be a node (e.g., communication endpoint) of an electronic, computer framework (e.g., the decentralized platform shown as the architecture 200) including and/or employing any number and combination of computing device and networks utilizing various communication technologies, as described herein. The device 202, the computing platforms 203 and 204, and the server 205 can be easily scalable, extensible, and modular, with the ability to change to different services or reconfigure some features independently of others. Examples of the device 202, the computing platforms 203 and 204, and the server 205 can include, but are not limited to, a stationary/standalone device, a base station, a desktop/laptop computer, a smart phone, a smartwatch, a tablet, or other device configured to communicate across the network 206. Accordingly, the device 202, the computing platforms 203 and 204, and the server 205 can be programed to execute computer instructions with respect the engine 201.

As an example, the server 205 includes the system memory 221 and the processor 222 connected via a system bus 223, which also connects an adapter 224. Generally, the system memory 221 can be any non-transitory tangible media, such as magnetic, optical, or electronic memory (e.g., any suitable volatile and/or non-volatile memory, such as random-access memory or a hard disk drive). The system memory 221 stores the computer instructions for execution by the processor 222. The processor 222 can be any central processing unit, graphical processing unit, microprocessor, field-programmable array, or the like capable of executing the computer instructions. The system bus 223 enables internal communications between the system memory 221, the processor 222, and the adapter 224. The adapter 224 can include a separate transmitter, a separate receiver, and/or an integrated transmitter/receiver to enable external communications from the server 205 through the network 206 and/or directly to the device 202. The system memory 221 can include/store a repository 225 and/or software (e.g., the engine 201). The repository 225 can be database (e.g., an SQL database) and/or another storage mechanism. The system memory 221, the processor 222, and the system bus 223 are representative of elements of the device 202 and the computing platforms 203 and 204, though not repeated therein for efficiency and brevity.

As an example, the device 202 can include a control device 227 and a display 228 (or other input/output elements. The control device 227, such as a computer mouse, a keyboard, a touchpad, a touch screen, a keypad, or the like, may be further coupled to the device 202 for input (e.g., one or more inputs may be provided by a user. The display 228 is configured to provide one or more UIs or GUIs that can be generated and provided by the engine 201, as the users interacts with the device 305. Examples of the display 341 can include, but are not limited to, a plasma, a liquid crystal display (LCD), a light emitting diode (LED), a field emission display (FED), an organic light emitting diode (OLED) display, a flexible OLED display, a flexible substrate display, a projection display, a 4K display, a high definition (HD)

display, a Retina© display, an in-plane switching (IPS) display or the like. The display 228 may be configured as a touch, three dimensional (3D) touch, multi-input touch, or multi-touch display using resistive, capacitive, surface-acoustic wave (SAW) capacitive, infrared, optical imaging, dispersive signal technology, acoustic pulse recognition, frustrated total internal reflection, or the like as understood by one of ordinary skill in the art for input/output (I/O). The control device 227 and the display 228 are representative of elements of the computing platforms 203 and 204 and the server 205, though not repeated therein for efficiency and brevity.

The network 206 can be a wired network, a wireless network, or include one or more wired and wireless networks. According to an embodiment, the network 206 can be a short-range network (e.g., local area network (LAN), or personal area network (PAN)). Information can be sent, via the network 206, between the device 202, the computing platforms 203 and 204, and the server 205 using any one of various short-range wireless communication protocols, such as Bluetooth, Wi-Fi, Zigbee, Z-Wave, near field communications (NFC), ultra-band, Zigbee, or infrared (IR). According to an embodiment, the network 206 can be one or more of an Intranet, a local area network (LAN), a wide area network (WAN), a metropolitan area network (MAN), a direct connection or series of connections, a cellular telephone network, or any other network or medium capable of facilitating communication between the device 202, the computing platforms 203 and 204, and the server 205. Information can be sent, via the network 206, using any one of various long-range wireless communication protocols (e.g., TCP/IP, HTTP, 3G, 4G/LTE, or 5G/New Radio). Note that, for the network 206, wired connections can be implemented using Ethernet, Universal Serial Bus (USB), RJ-11 or any other wired connection and wireless connections can be implemented using Wi-Fi, WiMAX, and Bluetooth, infrared, cellular networks, satellite or any other wireless connection methodology.

The network 206 can include one or more additional nodes 230, as well as the service 207. Each node 230 of the network 206 contributes as a communication endpoint to the decentralized platform provided by the architecture 200. The service 207 can be particular type of node 230 that provides anchor operations and support, but not control, to the decentralized platform provided by the architecture 200. For instance, the service 207 can support part of the blockchain of the architecture 200. Generally, a blockchain is a distributed database for maintaining a secure and decentralized record of transactions and shared among the nodes 230, the service 207, the device 202, the computing platforms 203 and 204, and the server 205 of the architecture 200.

According to one or more embodiments, the architecture 200 includes distributed identity (DID) management. The DID management enables users to create DIDs, which are cryptographically secure and reusable DIDs. The DID management enables the created DIDs to be associated with the blockchain of the architecture 200. That is, each DID can independently, anonymously, and securing manage all digital information and services for a particular user/device/server/node. For example, the server 205 and the engine 201 work in cooperation with the service 207 in the blockchain to provide the DID management. The DID management can enable obfuscate an identity of the server 205 to support private and autonomous social media activity within the architecture 200, as well as other secure, private, personal data and computing provisions of the engine 201. The DID management can enable obfuscate an identity of the user to support private and autonomous social media activity within the decentralized platform.

Each DID can include a public-private key combination (i.e., a public key and a private key). A public key can be a cryptography element available for anyone to use for encrypting and/or signing data. Copies of the public key can be shared on other parts of the architecture 200, such as with the blockchain of the service 207. A private key can be a cryptography element available for individual use for encrypting and/or signing data. For example, data encrypted with the public key can only be decrypted with the private key. As shown in FIG. 2, the DID of the server 205 enables the engine 201 to store keys 241, 242, 243, and 244 within the repository 225. Additional keys 245 and 246 can be present within the architecture 200.

According to one or more embodiments, the server 205 is implemented as a physical server of the architecture 200 (i.e., a decentralized platform). For example, the server 205 can be a private server, such as physical unit purchased and managed locally by a user. As another example, the server 205 and operations thereof can be implemented/contained in another unit (i.e., or extendable beyond any private server), such as in a jump drive, etc.

By way of example, a user/customer purchases the server 205 (i.e., a private server) that, when brought online, creates and includes a DID with the public key 241 and the private key 242 for the server 205 and a DID with the public key 243 and the private key 244 for the user/customer. The user/customer uses the device 202 (i.e., a mobile phone) to download the second instance 201A of the engine 201 (i.e., a terminal application) to configure the server 205. Configuring the server 205 includes enabling the user to name (create a username) for the server 205, which in turn is used for the DID of the server 205. The user/customer sees only the username on the display 228 when viewing the server 205. In the background, the terminal application with the server 205 creates the associations for that user/customer to have exclusive control of the server 205. Public data (e.g., a copy 241.*c* of the public key 241) is stored in the blockchain, and the terminal application receives a copy 242.*c* of the private key 242 for the DID of the server. Further, if the user/customer desires to share access to the server 205, the user/customer can send an invite that seamlessly and in the background shares a copy 241.*c* of the public key 241. In turn, the user/customer may never know that they are using blockchain and public-private key mechanism.

According to one or more embodiments, the architecture 200 can include a private cloud. In turn, the server 205 can be virtualized, as well, in the private cloud. The engine 201 implements the decentralized platform (i.e., the architecture 200), such as by configuring the server 205 (e.g., the private server or a software-based private server) and/or the private cloud.

With respect to operations of the engine 201, by way of example, the system memory 221 of the server 205 stores instructions of the engine 201 for execution by the processor 222. Generally, upon execution of the instructions of the engine 201, the server 205 can locally privatize data storage and user behavior to eliminate a need for third-party central authority management or third-party data storage (e.g., thereby enable users to create, distribute, and consume their digital information and services within the architecture 200). More particularly, the repository 225 can locally store digital information and services, models, neural networks, machine learning, artificial intelligence, automations, documents, entities, confidence metrics, images, segments, hashes, video, frames, source data, source code, etc., for access by the engine 201. The engine 201 can then utilize the models, the neural networks, the machine learning, the artificial intelligence, etc. to locally create, distribute, and consume the digital information and services. Thus, the engine 201 can provide or be part of a framework/mechanism that automatically implements a decentralized server approach (i.e., the architecture 200).

By further example, the scope and operation of the engine 201 can be described with respect to a social media experience that containerizes and shares digital information and services in a decentralized manner, utilizing a software-based private server (i.e., the server 205). The engine 201 can be implemented/contained on a variety of commuting platforms, including Internet of Things (IoT) devices, dedicated local hardware, and mobile devices, as well as virtualized version in one or more cloud computing providers. In this regard, the engine 201 through its operations implement the decentralized platform to support private and autonomous social media activity (e.g., the digital information and services) through secure, private, personal data and computing provisions. Operations 251, 252, 253, 254, 255, and 256 represent examples of such secure, private, personal data and computing provisions, though the engine 201 is not limited thereto.

Figure 3:
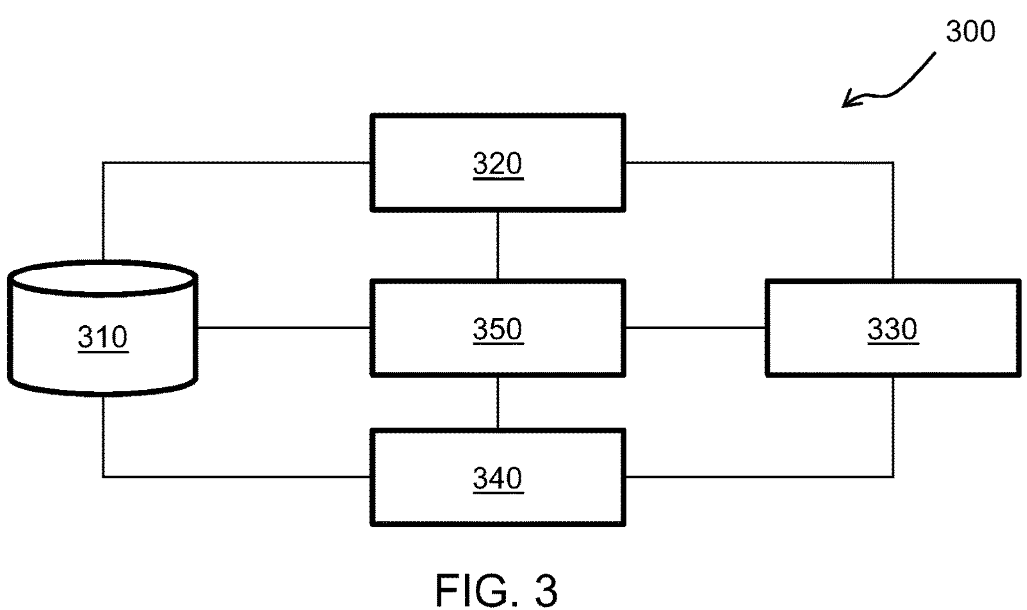
FIG. 3 illustrates a system according to one or more embodiments.
Figure 4:
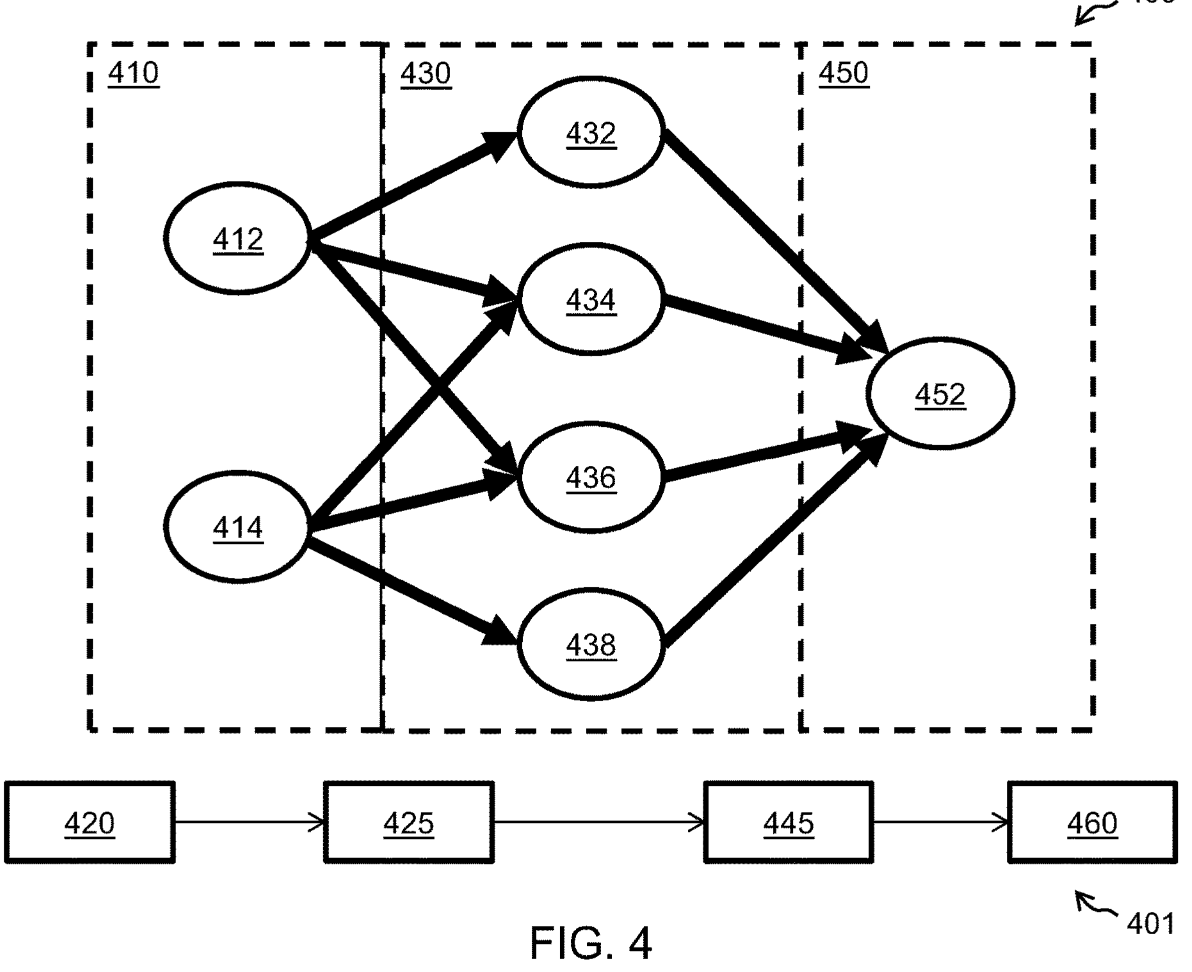
FIG. 4 illustrates a system and a method according to one or more embodiments.

Regarding operation 251, the engine 201 can enable a user (e.g., owner of the server 205) control of the social media experience by providing machine learning and/or an artificial intelligence (ML/AI). The ML/AI of the engine 201 can provide the social media experience, such as automatic suggestions of nodes 230, repositories 225, and connections. The ML/AI of the engine 201 can provide the social media experience by automatically organizing the digital information, providing notifications to other users, and encrypting user interactions/communications. The ML/AI of the engine 201 can provide the social media experience by designing personalized interactions, eliciting emotion based on the digital information and connections, and driving stronger and deeper relationships within the connections. The ML/Al of the engine 201 can provide the social media experience by automatically setting permissions. FIGS. 3-4 describe ML/Al with respect to the engine 201.

FIG. 3 illustrates a diagram of a system 300 according to one or more embodiments. The system 300 includes data 310 (e.g., the digital information and services), a machine 320, a model 330, an outcome 340, and (underlying) hardware 350. FIG. 4 illustrates diagrams of a system 400 (e.g., a neural network) and a method 401 performed in the system 400 are shown according to one or more embodiments. The system 400 operates to support implementation of the ML/AI algorithms described herein (e.g., as implemented by the engine 201). The system 400 can be implemented in hardware, such as the machine 320 and/or the hardware 350 of FIG. 3. The description of FIGS. 3-4 is made with reference to other FIGS. for ease of understanding where appropriate. For example, the machine 310 and the model 330 can represent aspects of the engine 201 of FIG. 2 (e.g., ML/AI algorithm therein), while the hardware 350 can also represent the server 205 of FIG. 2.

In general, the ML/Al algorithms of the system 300 (e.g., as implemented by the engine 201 of FIG. 2) operate with respect to the hardware 350, using the data 310, to train the machine 320, build the model 330, and predict the outcomes 340. For instance, the machine 320 operates as the controller or data collection associated with the hardware 350 and/or is associated therewith. The data 310 can be on-going data or output data associated with the hardware 350. The data 310 can also include currently collected data, historical data, or other data from the hardware 350 and can be related to the hardware 350. The data 310 can be divided by the machine 320 into one or more subsets. Further, the machine 320 trains, such as with respect to the hardware 350. This training can also include an analysis and correlation of the data 310 collected. In accordance with another embodiment, training the machine 320 can include self-training by the engine 201 of FIG. 2 utilizing the one or more subsets. Moreover, the model 330 is built on the data 310 associated with the hardware 350. Building the model 330 can include physical hardware or software modeling, algorithmic modeling, and/or the like that seeks to represent the data 310 (or subsets thereof) that has been collected and trained. In some aspects, building of the model 330 is part of self-training operations by the machine 320. The model 330 can be configured to model the operation of hardware 350 and model the data 310 collected from the hardware 350 to predict the outcome 340 achieved by the hardware 350. Predicting the outcomes 340 (of the model 330 associated with the hardware 350) can utilize a trained model 330. Thus, using the outcome 340 that is predicted, the machine 320, the model 330, and the hardware 350 can be configured accordingly.

Thus, for the system 300 to operate with respect to the hardware 350, using the data 310, to train the machine 320, build the model 330, and predict the outcomes 340, the ML/AI algorithms therein can include neural networks. In general, a neural network is a network or circuit of neurons, or in a modern sense, an artificial neural network (ANN), composed of artificial neurons or nodes or cells. For example, an ANN involves a network of processing elements (artificial neurons) which can exhibit complex global behavior, determined by the connections between the processing elements and element parameters. In more practical terms, neural networks are non-linear statistical data modeling or decision-making tools that can be used to model complex relationships between inputs and outputs or to find patterns in data. Thus, ANNs may be used for predictive modeling and adaptive control applications, while being trained via a dataset. Note that self-learning resulting from experience can occur within ANNs, which can derive conclusions from a complex and seemingly unrelated set of information. The utility of artificial neural network models lies in the fact that they can be used to infer a function from observations and also to use it. According to one or more embodiments, the neural network can implement a deep neural network, a long short-term memory neural network architecture, a convolutional neural network (CNN) architecture, or other the like. The neural network can be configurable with respect to a number of layers, a number of connections (e.g., encoder/decoder connections), a regularization technique (e.g., dropout); and an optimization feature.

In an example operation, the engine 201 of FIG. 2 includes collecting the data 310 from the hardware 350. In the system 400, an input layer 410 is represented by a plurality of inputs (e.g., inputs 412 and 414 of FIG. 4). With respect to block 420 of the method 401, the input layer 410 receives the inputs 412 and 414. The inputs 412 and 414 can include the digital information and services or other date of the repository 225. At block 425 of the method 401, the system 400 encodes the inputs 412 and 414 utilizing any portion of the data 310 (e.g., the dataset and predictions produced by the system 300) to produce a latent representation or data coding. The latent representation includes one or more intermediary data representations derived from the plurality of inputs. According to one or more embodiments, the latent representation is generated by an element-wise activation function (e.g., a sigmoid function or a rectified linear unit) of the engine 201 of FIG. 2. As shown in FIG. 4, the inputs 412 and 414 are provided to a hidden layer 430 depicted as including nodes 432, 434, 436, and 438. The system 400 performs the processing via the hidden layer 430 of the nodes 432, 434, 436, and 438 to exhibit complex global behavior, determined by the connections between the processing elements and element parameters. Thus, the transition between layers 410 and 430 can be considered an encoder stage that takes the inputs 412 and 414 and transfers it to a deep neural network (within layer 430) to learn some smaller representation of the input (e.g., a resulting the latent representation). This encoding provides a dimensionality reduction of the inputs 412 and 414. Dimensionality reduction is a process of reducing the number of random variables (of the inputs 412 and 414) under consideration by obtaining a set of principal variables. For instance, dimensionality reduction can be a feature extraction that transforms data (e.g., the inputs 412 and 414) from a high-dimensional space (e.g., more than 10 dimensions) to a lower-dimensional space (e.g., 2-3 dimensions). The technical effects and benefits of dimensionality reduction include reducing time and storage space requirements for the data 310, improving visualization of the data 310, and improving parameter interpretation for machine learning. This data transformation can be linear or nonlinear. The operations of receiving (block 420) and encoding (block 425) can be considered a data preparation portion of the multi-step data manipulation by the engine 201. At block 445 of the method 410, the system 400 decodes the latent representation. The decoding stage takes the encoder output (e.g., the resulting the latent representation) and attempts to reconstruct some form of the inputs 412 and 414 using another deep neural network. In this regard, the nodes 432, 434, 436, and 438 are combined to produce in the output layer 450 an output 452, as shown in block 460 of the method 410. That is, the output layer 450 reconstructs the inputs 412 and 414 on a reduced dimension but without the interferences, artifacts, and noise.

Regarding operation 252, the engine 201 can provide the social media experience through different platforms/modes/options for computing and/or storage, such as a stationary/standalone device, a base station, a desktop/laptop computer, a smart phone, a smartwatch, a tablet, a jump drive, or other device. In this regard, the social media experience includes one or more interfaces (e.g., user interfaces or UI) that provide user friendly interactions with the engine 201.

Regarding operation 253, the engine 201 can enable a user (e.g., owner of the server 205) control of the social media experience by providing configuration control over digital information and services. Examples of configuration control over digital information and services include setting permissions. The permissions can include configurations for access and sharing of pictures and stories. The permissions can include configurations for messaging, partitioning aspects of the social networking by invitation, etc. One or more advantages, technical effects, and/or benefits of this configuration control of the engine 201 can include providing private data sharing to only authorized users who are able to access the digital information and services.

Figure 5:
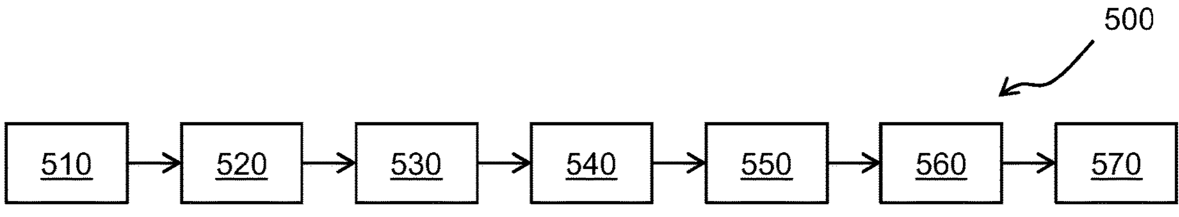
FIG. 5 illustrates a method according to one or more embodiments.

According to one or more embodiments, the engine 201 provides configuration control over digital information and services through creating a DID and profile. Turning to FIG. 5, a method 500 is illustrated according to one or more embodiments. The method 500, generally, illustrates DID management operations (e.g., creating the DID and the profile) by the engine 201, such as onboarding a user by creating the DID.

The method 500 begins at block 510, where the engine 201 receives a username and password. The engine 201 can receive the username and password from a user or other mechanism. At block 520, the engine 201 generates a seed. At block 530, the engine 201 generates a DID with the seed. The DID can independently, anonymously, and securing manage all UID information for a particular user. In this way, data is passed to the engine 201 which returns a DID. According to one or more embodiments, DID is generated with no identifying information, such that the username is attached to the DID and the DID is encrypted on user devices (e.g., the device 202).

At block 540, the engine 201 creates a profile with respect to the DID. The engine 201 can further store/save the DID and/or the profile. According to one or more embodiments, the computing and/or storage modes of the engine 201 can include username configurations, such as letter characteristics (e.g., lowercase vs. capital), special characters, alphanumeric values, string length, and exclusions, to assist in obfuscating identity and providing anonymity for the social media experience. According to one or more embodiments, the computing and/or storage modes of the engine 201 can include password configurations to assist in securing the social media experience.

At block 550, the engine 201 encrypts the password. The seed can also be encrypted. At block 560, the engine 201 stores/saves the profile, the DID, the encrypted password, and the seed (e.g., an encrypted seed), as well as any keys. The engine 201 can utilize local or cloud storage. At block 570, the engine 201 returns the profile, the DID, the encrypted password, and the seed (e.g., the encrypted seed), as well as any keys.

Regarding operation 254, the engine 201 can enable a user (e.g., owner of the physical server) control of the social media experience by providing configuration control for inviting and managing one or more guests who are permitted to see and comment on the digital information and services provided by the user. One or more advantages, technical effects, and/or benefits of this configuration control of the engine 201 can include providing secure, private group communication with users. According to one or more embodiments, the engine 201 can include user categories, such as owner, member, and guest, each of which can have configurable roles and permissions respective to a particular social media experience. According to one or more embodiments, managing guests can include accepting, blocking, and/or deleting other users from accessing the server 205. For example, a member or a guest can have access to digital information and services of an owner by invitation only.

Regarding operation 255, the engine 201 can enable a user (e.g., owner of the physical server) control of the social media experience by providing a cryptographic wallet experience. That is, the engine 201 can implement and/or support one or more cryptographic wallets. One or more advantages, technical effects, and/or benefits of the one or more cryptographic wallets of the engine 201 can include private financial transactions independent from any third-party central authority.

Regarding operation 256, the engine 201 can be extendable and connectable to third-party software, such as in support of or in operation with an application store or marketplace.

Figure 6:
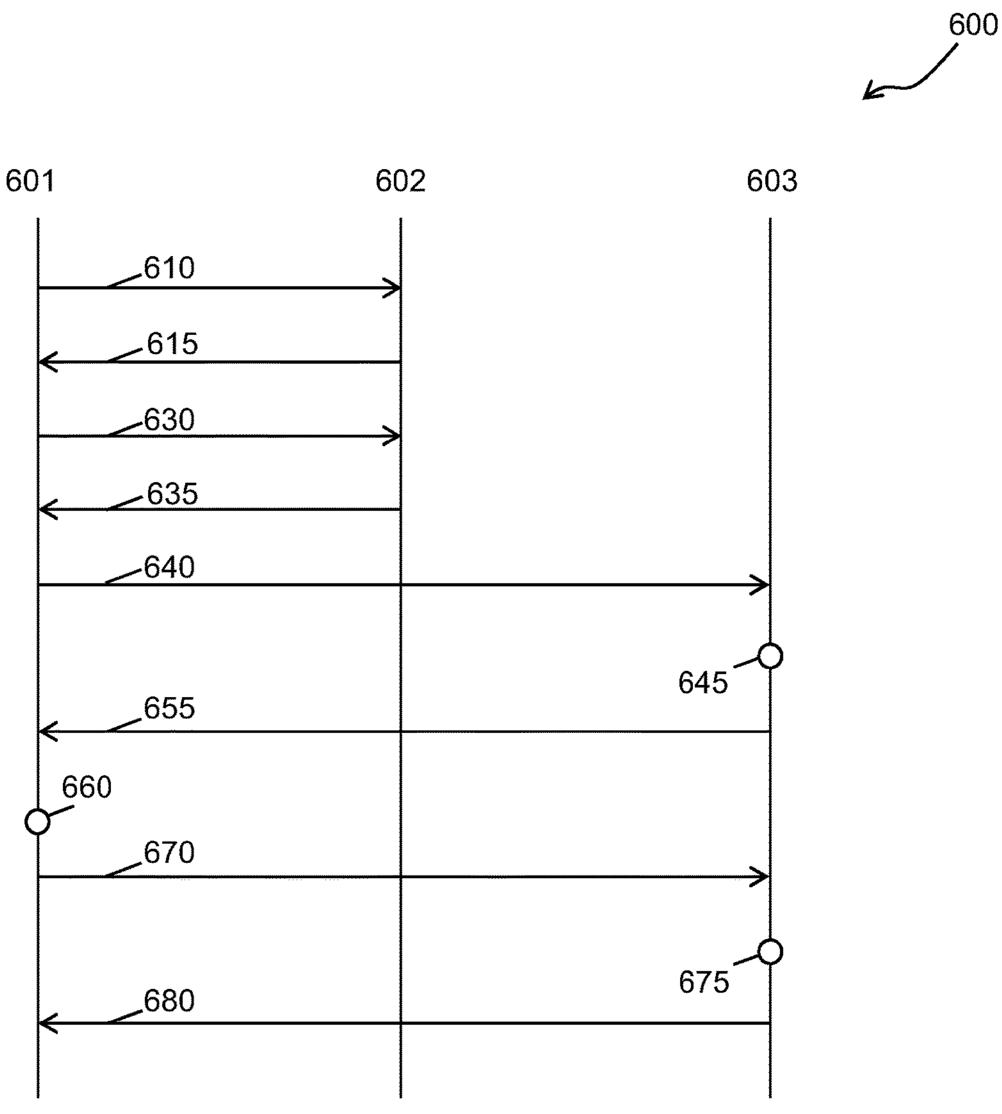
FIG. 6 illustrates a communication schematic according to one or more embodiments.

Turning now to FIG. 6, a communication schematic 600 according to one or more embodiments. The communication schematic 600 illustrates how the engine 201 addresses a need to eliminate third-party central authority management by providing a multi-step manipulation of the digital information and services that enables direct user control of the digital information and services.

The communication schematic 600 occurs across a mobile device 601, a decentralized data network 602, and a server box 603, which can respectively align to the device 202, the architecture 200, and the server 205 of FIG. 2. Generally, within the communication schematic 600, trust is established by invite, thereby eliminating automatic trust through conventional public key system. Further, the operations that establish this trust by invite within the communication schematic 600 are hidden from users. Each of the mobile device 601, the decentralized data network 602, and the server box 603 have an instance of the engine 201 executing therein.

Within the communication schematic 600, the mobile creates a new DID for a user. The new DID identifies or points to a profile. The engine 201 of the mobile device 601 protocol level service that received different type of information. The engine 201 can enable user selection or automatic generation if the information that is used to create the DID. At arrow 610, this new DID is pushed to the decentralized data network 602. According to one or more embodiments, the DID is created on the mobile device 601 and then sent to the decentralized data network 602 for storage, and the decentralized data network 602 only returns success/fail of storage.

At arrow 615, the decentralized data network 602 returns one or more keys (e.g., public private key system that pairs of public and private cryptographic keys). The one or more keys can be used to implements the owner authorization flow, track ownership, receive or spend cryptocurrencies, etc. A public key allows others to generate strings derived from the public key and/or make payments to an address derived from the public key. A private key enables decoding of the strings or addresses. Note that a private key is never stored by the decentralized data network 602, while the public key is supported by the decentralized data network 602. According to one or more embodiments, the decentralized data network 602 only ever knows about a public key of the public private key system.

In response, the mobile device 601 provides to the decentralized data network 602 with updates to the profile. In this way, as shown by arrow 630, the mobile device 601 informs the decentralized data network 602 of an address (e.g., an IP address) of the server box 603. Further, the mobile device 610 can read and/or acquire (as shown by arrow 635) information from the decentralized data network 602. This information can include metadata, such as location information (the IP address).

At arrow 640, the mobile device 601 communicates with the server box 603. According to one or more embodiments, the mobile device 601 can request access the server box 603. According to one or more embodiments, the mobile device 601 can receive an invite that includes an authorization to access the server box 603.

In response, at circle 645, the server box 603 encodes a random string with a public key associated with the DID utilized by the mobile device 601 to produce an encoded string. At arrow 655, the server box 603 returns the encoded string to the mobile device 601. At circle 660, the mobile device 601 decodes the encoded string with a private key associated with the DID utilized by the mobile device 601 to produce a decoded string. At arrow 670, the mobile device 601 sends the decoded string to the server box 603. At dot 675, the server box 603 compares the decoded string with the random string. In this way, the server box 603 attempts to verify that the mobile device 601 is who they are representing themselves to be (i.e., a tactical DID implementation to gain access to an environment). At arrow 680, the server box 603 sends/returns a response to the mobile device 601. The response can be a yes or no based on the compare, indicate an error, etc.

According to one or more embodiments, a method is implemented by an engine to manage distributed identities for users of a decentralized platform. The engine is executed by at least one processor within the decentralized platform. The method includes generating a cryptographically secure and reusable distributed identity for an owner that obfuscates an identity of the owner and associating the cryptographically secure and reusable distributed identity with a blockchain of the decentralized platform. The method includes gating, via an owner authorization flow by the engine, access to digital information and services for one or more of the users of the decentralized platform. The digital information and services being associated with the cryptographically secure and reusable distributed identity.

According to one or more embodiments or any of the method embodiments herein, the cryptographically secure and reusable distributed identity can include a cryptographic hash of a username to obfuscate the identity of the user.

According to one or more embodiments or any of the method embodiments herein, cryptographically secure and reusable distributed identity can independently and securely manage digital information and services for the owner.

According to one or more embodiments or any of the method embodiments herein, the blockchain can guarantee fidelity and security for the cryptographically secure and reusable distributed identity.

According to one or more embodiments or any of the method embodiments herein, the owner authorization flow can include a user controlled process that supports inviting one or more of the users of the decentralized platform to participate in private social media activity.

According to one or more embodiments or any of the method embodiments herein, the owner authorization flow can include a user controlled process that supports inviting other users to participate in private decentralized platform activity.

According to one or more embodiments or any of the method embodiments herein, the cryptographically secure and reusable distributed identity can include public-private key combination.

According to one or more embodiments or any of the method embodiments herein, gating access can include assigning one or more user categories to digital identities of the users.

According to one or more embodiments or any of the method embodiments herein, the one or more user categories comprise an owner, a member, and a guest According to one or more embodiments or any of the method embodiments herein, the digital information and services can include one or more secure, private, personal data and computing provisions of the decentralized platform with respect to the owner.

According to one or more embodiments, a decentralized platform includes at least one processor and an engine. The engine is configured to manage distributed identities for users of a decentralized platform. The engine is executed by the at least one processor to generate a cryptographically secure and reusable distributed identity for an owner that obfuscates an identity of the owner and associate the cryptographically secure and reusable distributed identity with a blockchain of the decentralized platform. The engine is further executed by the at least one processor to gate, via an owner authorization flow, access to digital information and services for one or more of the users of the decentralized platform. The digital information and services being associated with the cryptographically secure and reusable distributed identity.

According to one or more embodiments or any of the decentralized platform embodiments herein, the cryptographically secure and reusable distributed identity can include a cryptographic hash of a username to obfuscate the identity of the user.

According to one or more embodiments or any of the decentralized platform embodiments herein, cryptographically secure and reusable distributed identity can independently and securely manage digital information and services for the owner.

According to one or more embodiments or any of the decentralized platform embodiments herein, the blockchain can guarantee fidelity and security for the cryptographically secure and reusable distributed identity.

According to one or more embodiments or any of the decentralized platform embodiments herein, the owner authorization flow can include a user controlled process that supports inviting one or more of the users of the decentralized platform to participate in private social media activity.

According to one or more embodiments or any of the decentralized platform embodiments herein, the owner authorization flow can include a user controlled process that supports inviting other users to participate in private decentralized platform activity.

According to one or more embodiments or any of the decentralized platform embodiments herein, the cryptographically secure and reusable distributed identity can include public-private key combination.

According to one or more embodiments or any of the decentralized platform embodiments herein, gating access can include assigning one or more user categories to digital identities of the users.

According to one or more embodiments or any of the decentralized platform embodiments herein, the one or more user categories comprise an owner, a member, and a guest.

According to one or more embodiments or any of the decentralized platform embodiments herein, the digital information and services can include one or more secure, private, personal data and computing provisions of the decentralized platform with respect to the owner.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. A computer readable medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Examples of computer-readable media include electrical signals (transmitted over wired or wireless connections) and computer-readable storage media. Examples of computer-readable storage media include, but are not limited to, a register, cache memory, semiconductor memory devices, magnetic media such as internal hard disks and removable disks, magneto-optical media, optical media such as compact disks (CD) and digital versatile disks (DVDs), a random access memory (RAM), a read-only memory (ROM), an erasable programmable read-only memory (EPROM or Flash memory), a static random access memory (SRAM), and a memory stick. A processor in association with software may be used to implement a radio frequency transceiver for use in a terminal, base station, or any host computer.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The descriptions of the various embodiments herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method implemented by an engine to manage distributed identities for users of a decentralized platform, the engine executed by at least one processor within the decentralized platform, the method comprises:

generating, by the engine, a cryptographically secure and reusable distributed identity for an owner that obfuscates an identity of the owner, wherein the cryptographically secure and reusable distributed identity comprises a cryptographic hash of a username to obfuscate the identity of the owner, wherein trust is established by invite within the decentralized platform, thereby eliminating automatic trust through a conventional public key system;

associating, by the engine, the cryptographically secure and reusable distributed identity with a blockchain of the decentralized platform; and gating, via an owner authorization flow by the engine, access to digital information and services for one or more of the users of the decentralized platform by assigning one or more user categories to digital identities of the users, the digital information and services being associated with the cryptographically secure and reusable distributed identity, wherein the owner authorization flow invites participation in private social media activity within the decentralized platform, and wherein the engine is implemented through multiple different instances located on different nodes within the decentralized platform, and wherein the engine is communicating across the multiple different instances.

2. The method of claim 1, wherein the cryptographically secure and reusable distributed identity independently and securely manages digital information and services for the owner.

3. The method of claim 1, wherein the blockchain guarantees fidelity and security for the cryptographically secure and reusable distributed identity.

4. The method of claim 1, wherein the owner authorization flow comprises a user controlled process that supports inviting the one or more of the users of the decentralized platform to participate in the private social media activity.

5. The method of claim 1, wherein the owner authorization flow comprises a user controlled process that supports inviting other users to participate in private decentralized platform activity.

6. The method of claim 1, wherein the cryptographically secure and reusable distributed identity comprises public-private key combination.

7. The method of claim 1 wherein the one or more user categories comprise an owner, a member, and a guest.

8. The method of claim 1, wherein the digital information and services comprise one or more secure, private, personal data and computing provisions of the decentralized platform with respect to the owner.

9. A decentralized platform comprising:

at least one processor; and an engine configured to manage distributed identities for users of a decentralized platform, the engine being executed by the at least one processor to:

generate a cryptographically secure and reusable distributed identity for an owner that obfuscates an identity of the owner, wherein the cryptographically secure and reusable distributed identity comprises a cryptographic hash of a username to obfuscate the identity of the owner, wherein trust is established by invite within the decentralized platform, thereby eliminating automatic trust through a conventional public key system;

associate the cryptographically secure and reusable distributed identity with a blockchain of the decentralized platform; and gate, via an owner authorization flow, access to digital information and services for one or more of the users of the decentralized platform by assigning one or more user categories to digital identities of the users, the digital information and services being associated with the cryptographically secure and reusable distributed identity, wherein the owner authorization flow invites participation in private social media activity within the decentralized platform, and wherein the engine is implemented through multiple different instances located on different nodes within the decentralized platform, and wherein the engine is communicating across the multiple different instances.

10. The decentralized platform of claim 9, wherein the cryptographically secure and reusable distributed identity independently and securely manages digital information and services for the owner.

11. The decentralized platform of claim 9, wherein the blockchain guarantees fidelity and security for the cryptographically secure and reusable distributed identity.

12. The decentralized platform of claim 9, wherein the owner authorization flow comprises a user controlled process that supports inviting the one or more of the users of the decentralized platform to participate in the private social media activity.

13. The decentralized platform of claim 9, wherein the owner authorization flow comprises a user controlled process that supports inviting other users to participate in private decentralized platform activity.

14. The decentralized platform of claim 9, wherein the cryptographically secure and reusable distributed identity comprises public-private key combination.

15. The decentralized platform of claim 9 wherein the one or more user categories comprise an owner, a member, and a guest.

16. The method of claim 1, wherein the cryptographically secure and reusable distributed identity enables anonymity and control within the decentralized platform to an exclusion of one or more digital identities or to an exclusion of one or more third-parties.

17. The method of claim 1, wherein the cryptographically secure and reusable distributed identity enables anonymity and control within the decentralized platform to an exclusion of one or more third-parties.

18. The method of claim 1, wherein each of the multiple different instances act together in a multi-part contribution process to create and provide a social media experience.

19. The method of claim 1, wherein the blockchain generates trust between nodes within the decentralized platform without a need for a third-party central authority.

20. The method of claim 1, wherein the decentralized platform implements local data retention.

* * * * *